March 3, 1970     H. LOHMANN     3,498,433
ACTUATING MECHANISM FOR VEHICLE FRICTION CLUTCHES, ESPECIALLY
FOR MAIN CLUTCHES OF MOTOR VEHICLES
Filed July 6, 1967
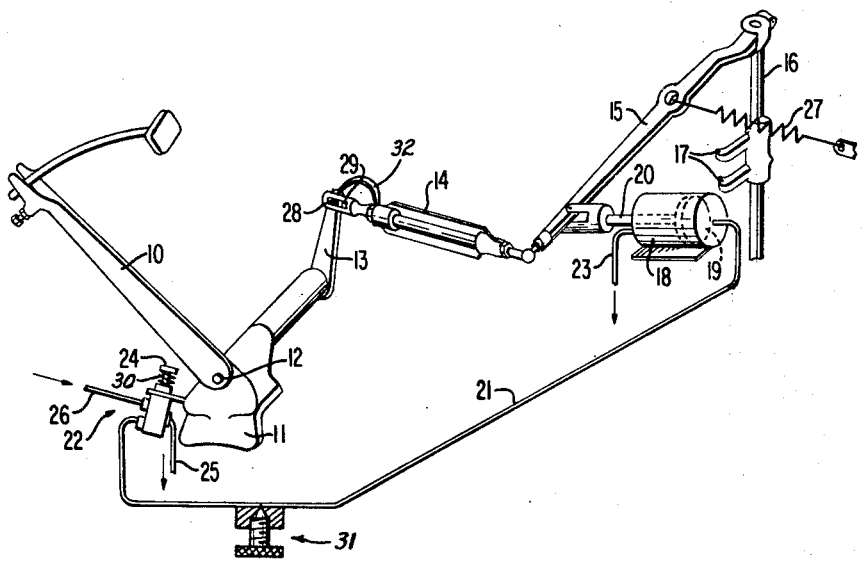
INVENTOR
HELMUT LOHMANN
BY
*Dicke & Craig*
ATTORNEYS United States Patent Office 3,498,433
Patented Mar. 3, 1970

3,498,433
ACTUATING MECHANISM FOR VEHICLE FRICTION CLUTCHES, ESPECIALLY FOR MAIN CLUTCHES OF MOTOR VEHICLES
Helmut Lohmann, Gaggenau, Germany, assignor to Daimler-Benz Aktiengesellschaft, Stuttgart-Unterturkheim, Germany
Filed July 6, 1967, Ser. No. 651,418
Claims priority, application Germany, July 6, 1966, D 50,486
Int. Cl. F16d 19/00; G05g 1/14
U.S. Cl. 192—99                    17 Claims

ABSTRACT OF THE DISCLOSURE

An actuating mechanism for vehicle friction clutches, especially for main clutches of motor vehicles in which the clutch pedal is connected with the clutch-disengaging lever by way of a linkage and the transmission ratio of this linkage is so selected that at least nearly the entire stroke of the pedal is used for a first range corresponding to the pressure build-up at the pressure plate of the clutch and an auxiliary force actuation is used, controlled by the pedal near the end of the first range so as to further actuate the disengaging lever in a second range to completely lift off the pressure plate; a lost-motion connection is thereby provided in the linkage between the pedal and the disengaging lever so that the pedal is not taken along when the disengaging lever is further actuated by the auxiliary force actuating mechanism in the second range.

BACKGROUND OF THE INVENTION

The present invention relates to an actuating mechanism for vehicle friction clutches, especially for main clutches of motor vehicles, which are retained by a spring force in the engaged condition and are disengaged from a pedal in opposition to this spring force by way of a linkage by means of a diengaging lever.

The customary, prior art clutches of the aforementioned type are so constructed that only a relatively small portion of the possible disengaging and engaging path influences the contact pressure of the pressure plate at the clutch disk and therewith the magnitude of the engine torque to be absorbed or taken up by the clutch. The larger portion of this path thereby serves the purpose of lifting the pressure plate in order that the clutch disk is able to move freely. Thus, clutches are known in the prior art in which the length of the path for the build-up of the entire pressure at the pressure ring of the clutch amounts only to 2 mm., which, with the customary transmissions of the disengaging mechanism, results in a length of the pedal path of about 24 mm. However, of this pedal path length only that portion is always used during the starting which serves for the build-up of the respective contact pressure required for the transmission of the necessary torque.

With these relatively small lengths of the path or stroke at the pedal, already slight fluctuations of the foot change the contact pressure of the clutch very considerably so that a disagreeable pulling of the clutch may occur. It would be undoubtedly desirable to design the pedal transmission with a larger transmission ratio in favor of a larger pedal path within the starting range. This, however, is not possible with a given peral path because the stroke for the lifting or release of the pressure plate is reduced as a result thereof to the disadvantage of the free-wheeling or free rotation of the clutch disk which would lead to difficulties during the shifting of the transmission. Also, an overload of the synchronization installation in the transmission would then be the consequence.

SUMMARY OF THE INVENTION

The present invention aims at simultaneously achieving a maximum possible lifting or clearing path for the pressure plate and the advantage of a large transmission between the pressure ring and the pedal within the starting range. At the same time, the pedal pressures are also to be decreased.

The underlying problems are solved with the clutches of the aforementioned type in that the disengaging stroke at the disengaging lever or at the pressure plate is subdivided into a first range corresponding to the pressure build-up at the pressure plate and into a second range corresponding to the lifting off or clearing of the pressure plate, and in that the entire pedal stroke corresponds to the first range and an auxiliary force actuation effective at the disengaging lever is adapted to be additionally rendered effective at the end of the pedal stroke by means of a control device whereby the stroke of the auxiliary force actuation corresponds to the second range while the linkage part leading to the pedal is released during that time. Naturally, a certain intermediate range is provided between the two ranges according to the present invention in which the two ranges overlap. However, for the sake of clarity, this intermediate range is omitted in the discussions hereinabove.

One is able to achieve with the construction according to the present invention a large transmission between pedal and pressure ring for the first range intended for the starting. Consequently, the pedal can be actuated with a very fine feel. A pulling of the clutch is therefore no longer possible. The clearing or lifting off of the pressure plate takes place in that case by an auxiliary force actuation so that the maximum stroke is available also for the lifting off or release. The pedal is thereby not taken along. Only smaller pedal forces are still necessary owing to the larger transmission which additionally can be kept constant within the second range during the auxiliary force actuation.

The type of the auxiliary force actuation is left to a person skilled in the art. However, the present invention prefers a construction according to which a servo-piston actuated by a pressure medium and arranged in a working cylinder engages at the clutch-disengaging lever and whereby a control valve is arranged at the clutch pedal which normally relieves the working cylinder and connects the same with a pressure line upon actuation by the pedal. The present invention contemplates in the first instance to utilize the compressed air as the pressure medium because within relatively short periods of time, larger volumes have to be filled and emptied. However, in principle, also a hydraulic actuation is naturally within the scope of the present invention.

With one construction according to the present invention, a lost-motion connection with elongated aperture is provided in the linkage between the pedal and the disengaging lever, whose free stroke is larger than the stroke of the auxiliary force actuating device, i.e., therefore is larger than the second stroke range of the disengaging lever. It is thereby feasible to construct in principle this connection between the linkage parts only unilaterally so that the pedal takes along the clutch-disengaging lever in the disengaging direction but the disengaging lever is not able to take along the pedal. However, in order to prevent a rattling in this connection, the present invention also proposes to arrange a weak spring in this elongated-aperture or other analogous lost-motion connection of the linkage parts or in such other corresponding connection between the linkage parts, which spring keeps these linkage parts in constant abutment against one another in one of the end positions thereof.

The construction of the control mechanism as such may also be left to the discretion of a person skilled in the art.

A valve or a control slide valve structure of conventional construction may be selected therefor. However, the present invention proposes that a throttling device, possibly an adjustable throttling device is coordinated to the servo piston, by means of which one is able to influence the engaging velocity during the engagement of the clutch. It may thereby be advantageous if the control valve itself acts as throttle. It is possible in this manner without any difficulty to meter again by means of the clutch pedal the engaging velocity in the accustomed manner.

It is additionally proposed according to the present invention that the spring force of the return spring at the control device corresponds at least approximately to the force which is exerted by the clutch springs on the pedal at the point of response of the control device. Of course, the linkage transmission ratios have to be taken into consideration thereby.

It is achieved in this manner that during response of the auxiliary force actuation, the force remains the same at the pedal. The engagement of the auxiliary force actuation is therefore hardly noticed by the driver.

Accordingly, it is an object of the present invention to provide an actuating mechanism for vehicle friction clutches, especially for main clutches of motor vehicles which eliminates the aforementioned disadvantages encountered with the prior art constructions in an extremely simple and operationally effective manner.

Another object of the present invention resides in an actuating mechanism for vehicle friction clutches which effectively eliminates pulling of the clutch.

A further object of the present invention resides in a clutch-actuating mechanism for the clutches of motor vehicles which assures a relatively long pedal path in the starting range without jeopardizing the complete clearance and release of the pressure plate.

Still another object of the present invention resides in an actuating mechanism for clutches in vehicles which brings about simultaneously a large clearing path for the pressure plate together with a large transmission between disengaging lever and pedal in the starting range of the clutch actuation.

Still a further object of the present invention resides in a clutch-actuating mechanism for clutches of motor vehicles which not only achieves the aforementioned aims and objects with the simultaneous reduction of pedal pressures but additionally avoids any difficulties in the shifting of the transmission as well as possible overloads in the synchronization installation.

A further object of the present invention resides in a clutch-actuating mechanism which provides for the driver an improved sensitivity and better feel for the engagement and disengagement of the clutch.

These and further objects, features, and advantages of the present invention will become more obvious from the following description when taken in connection with the accompanying drawing, which shows, for purposes of illustration only, one embodiment in accordance with the present invention, and wherein:

The single figure is a schematic, perspective view of one embodiment of a clutch-actuating mechanism according to the present invention.

Referring now to the single figure of the drawing, reference numeral 10 designates therein the clutch pedal which is pivotally supported in the driver cab of the vehicle or any other suitable part thereof in a bearing support or bracket 11 in a conventional manner not further illustrated herein. The disengaging lever 15 of the clutch is actuated from the actuating shaft 12, connected with the pedal 10, by way of a lever 13 and an adjustable intermediate link 14. Of course, additional linkage members or deflecting levers may be interposed as may be necessary in a given construction. The disengaging lever 15 rests on and is operatively connected with a disengaging shaft 16 which engages by means of the disengaging fork 17 at the pressure ring (not shown) of the clutch. The clutch itself may be constructed in any known, suitable manner.

A working cylinder 18 is coordinated to the disengaging lever 15 of the clutch within which is arranged a servo-piston 19. The servo-piston 19 engages with its piston rod 20 at the disengaging lever 15. A pressure line 21 leads from the working cylinder 18 to a control valve generally designated by reference numeral 22 which is operatively associated with the clutch pedal 10. The other side of the working piston 19 is relieved by a way of a discharge line 23 or in any other suitable, conventional manner.

The control valve 22 which may be of any conventional construction is so coordinated to the clutch pedal 10 that it is actuated by means of the plunger 24 only at the end of the pedal stroke. Normally, in its non-actuated position, the control valve 22 connects the line 21 with a relief or discharge line 25. During the actuation, this connection is interrupted and the line 21, in contradistinction thereto, is connected with the pressure line 26. The pressure line 26 leads to a pressure tank (not shown) of any suitable, conventional construction.

OPERATION

The operation of the clutch-actuating mechanism according to the present invention is as follows:

In the illustrated position, the clutch is engaged. The clutch is disengaged by pressure on the pedal 10 in a conventional manner against the clutch springs 27—which are illustrated in the drawing only symbolically. The linkage transmission is thereby so selected that within this range, the clutch force is decreased. If this is realized toward the end of the pedal stroke, the plunger 24 of the control valve 22 is actuated by the clutch pedal 10. The working piston 19 now receives full pressure from the pressure line 26 by way of the line 21 and moves toward the left—as viewed in the drawing—whereby it further actuates the clutch-disengaging lever 15 and in this manner lifts off the pressure plate from the clutch disk. The clutch pedal 10 is thereby not taken along as the lever 13 engages with pins 28 in an elongated aperture 29 at the lever 14. Consequently, the pedal 10 can be kept by means of the foot in the same position whereby—as already mentioned—the pedal force remains the same due to the construction and selection of the return spring 30 at the control valve 22.

For the re-engagement of the clutch, the foot pressure at the clutch pedal 10 is decreased in the usual manner and the latter returns slowly. This return movement is feasible without difficulty owing to the elongated-aperture, lost-motion connection 28, 29 whose free stroke is larger than the stroke of the auxiliary force-actuating mechanism, i.e., is larger than the second stroke range of the disengaging lever 15. The control valve 22 is thereby again shifted and the working cylinder 18 is now relieved by way of lines 21 and 25. The clutch springs 27 now engage the clutch. A throttling device 31 may be provided in the manner already described hereinabove or the control valve 22 itself may be constructed as throttle which can be regulated with a very fine feel by means of the pedal 10. As soon as the pressure plate again abuts at the clutch disk, the free-stroke in the elongated aperture lost-motion connection 28, 29 is also used up and the final engagement, i.e., the build-up of the abutment or contact pressure takes place in the usual manner by slow retraction of the pedal 10. In the normal position of FIGURE 1 with the clutch engaged and the pedal released, the lost motion connection 28, 29 is held in the illustrated position by means of the bow spring 32 connected between linkage members 13 and 14.

While I have shown and described only one embodiment in accordance with the present invention, it is understood that the same is not limited thereto but is susceptible of numerous changes and modifications as known to a perosn skilled in the art, and I therefore do not wish to be limited to the details shown and described herein, but

I claim:

1. An actuating mechanism for a vehicle friction clutch pressure plate retained in the engaged position by a spring force and disengaged against this spring force by the mechanism including a pedal actuated linkage moving a clutch disengaging lever, wherein the improvement in the mechanism comprises means subdividing the disengaging stroke at the pressure plate actuated by the disengaging lever into a first range corresponding to the pressure build-up at the pressure plate and into a second range corresponding to the lifting off of the pressure plate, including means operatively connecting the pedal with the disengaging lever in such a manner that at least nearly the entire pedal stroke corresponds to the first range, auxiliary force actuating means adapted to become effective to move the disengaging lever through the second range, and means including control means for rendering said auxiliary force actuating means effective at the disengaging lever at the end of the pedal stroke, and means preventing movement of said pedal driving movement of the disengaging lever in the second range.

2. An actuating mechanism according to claim 1, wherein said auxiliary force actuating means includes a working cylinder provided with a servo-piston engaging at the disengaging lever, said control means including control valve means arranged at the pedal which normally relieves the working cylinder and connects the same with a pressure line upon actuation thereof by the pedal 3. An actuating mechanism according to claim 2, said means preventing movement comprising lost-motion connecting means provided in the linkage between the pedal and the disengaging lever for providing a lost motion larger than the stroke of the second stroke range of the disengaging lever.

4. An actuating mechanism according to claim 3, wherein said lost-motion connecting means includes a connection provided with an elongated aperture.

5. An actuating mechanism according to claim 4, further comprising weak spring means in said lost-motion connection means which keeps the linkage parts in constant abutment against one another in one of the end positions thereof.

6. An actuating mechanism according to claim 5, further comprising throttling means operatively associated with said servo-piston for influencing the engaging stroke of the clutch.

7. An actuating mechanism according to claim 6, wherein said throttling means is adjustable.

8. An actuating mechanism according to claim 7, wherein said control means includes a return spring, the spring force of the return spring at the control means corresponding at least approximately to the spring force exerted by the clutch springs on the pedal at the point of response of the control means.

9. An actuating mechanism according to claim 1, said means preventing movement comprising lost-motion connecting means provided in the linkage between the pedal and the disengaging lever for providing a lost motion larger than the stroke of the second stroke range of the disengaging lever.

10. An actuating mechanism according to claim 9, wherein said lost-motion connecting means includes a connection provided with an elongated aperture.

11. An actuating mechanism according to claim 9, further comprising weak spring means in said lost-motion connection means which keeps the linkage parts in constant abutment against one another in one of the end positions thereof.

12. An actuating mechanism according to claim 2, further comprising throttling means operatively associated with said servo-piston for influencing the engaging stroke of the clutch.

13. An actuating mechanism according to claim 12, wherein said throttling means is adjustable.

14. An actuating mechanism according to claim 1, wherein said control means includes a return spring, the spring force of the return spring at the control means corresponding at least approximately to the spring force exerted by the clutch springs on the pedal at the point of response of the control means.

15. An actuating mechanism according to claim 14, said means preventing movement comprising lost-motion connecting means provided in the linkage between the pedal and the disengaging lever for providing a lost motion larger than the stroke of the second stroke range of the disengaging lever.

16. An actuating mechanism according to claim 15, further comprising weak spring means in said lost-motion connection means which keeps the linkage parts in constant abutment against one another in one of the end positions thereof.

17. A clutch control linkage, comprising: a clutch disengaging member mounted for movement between a first position wherein the clutch would be completely engaged, through a second position wherein the clutch is just becoming disengaged, and to a third position where the clutch is completely disengaged; a manual operator having a first normal position and being mounted for movement through a second position to a third position; first means mechanically drivingly interconnecting said operator with said member only for movement between said first and second positions of said operator and said member; power means actuatable to move said member between said second and third positions; control means responsive to movement of said operator from said second position to said third position to actuate said power means.

References Cited

UNITED STATES PATENTS

| | | | |
|---|---|---|---|
| 495,540 | 4/1893 | Wyman | 192—99 X |
| 1,564,261 | 12/1925 | Mathieson et al. | |
| 1,588,658 | 6/1926 | Christensen | 74—512 X |
| 2,247,463 | 7/1941 | Allison. | |
| 3,333,665 | 8/1967 | Einchcomb et al. | 192—99 |

FRED C. MATTERN, JR., Primary Examiner

U.S. Cl. X.R.

74—512